United States Patent [19]

Bryant et al.

[11] Patent Number: 5,145,257
[45] Date of Patent: Sep. 8, 1992

[54] INFRARED FIBER-OPTICAL TEMPERATURE SENSOR

[75] Inventors: James E. Bryant, Dahlgren, Va.; John E. Bennett, Clemson, S.C.; William H. Pinkston, Berwyn, Pa.

[73] Assignee: The United States of America as represented by the Secretary of the Navy, Washington, D.C.

[21] Appl. No.: 744,046

[22] Filed: Aug. 12, 1991

Related U.S. Application Data

[63] Continuation of Ser. No. 501,996, Mar. 29, 1990, abandoned.

[51] Int. Cl.$^5$ .............................. G01J 5/00
[52] U.S. Cl. .................... 374/131; 374/129; 374/133; 250/338.1; 356/43
[58] Field of Search ............ 374/121, 124, 131, 132, 374/122, 123, 130, 10, 129, 133; 250/338.1; 356/43, 44

[56] References Cited

U.S. PATENT DOCUMENTS

| | | | |
|---|---|---|---|
| 3,768,059 | 10/1973 | Day | 374/133 X |
| 3,884,075 | 5/1975 | Brandli et al. | |
| 3,916,690 | 11/1975 | Brandli et al. | |
| 3,924,469 | 12/1975 | Brandli et al. | |
| 4,005,605 | 2/1977 | Michael | 374/133 X |
| 4,301,682 | 11/1981 | Everest | 374/133 X |
| 4,315,150 | 2/1982 | Darringer et al. | 374/130 X |
| 4,395,380 | 2/1983 | Rosh | 374/124 X |
| 4,575,259 | 3/1986 | Bacci et al. | |
| 4,619,533 | 10/1986 | Lucas et al. | 374/132 X |
| 4,707,605 | 11/1987 | Astheimer et al. | |
| 4,727,254 | 2/1988 | Wlodarczyk | 250/338 |
| 4,734,553 | 3/1988 | Noda | 250/338.1 |
| 4,741,626 | 5/1988 | Hashimoto | 374/133 |
| 4,773,766 | 9/1988 | Nagasaka et al. | 374/129 X |
| 4,785,174 | 11/1988 | Hodges et al. | 250/338.1 |
| 4,831,258 | 5/1989 | Paulk et al. | 374/121 X |
| 4,859,076 | 8/1989 | Twerdochlib | 374/10 |
| 4,924,478 | 5/1990 | Tank | 374/121 |

FOREIGN PATENT DOCUMENTS

0172224  10/1982  Japan ................. 374/132

Primary Examiner—William A. Cuchlinski, Jr.
Assistant Examiner—G. Bradley Bennett
Attorney, Agent, or Firm—John D. Lewis; Jacob Shuster

[57] ABSTRACT

A temperature sensor comprising a probe, infrared fibers, super-cooled detectors and their associated electronics, and a computer for determining the temperature from the output of the electronics. Photons from a heat source are collected by the infrared fibers and transmitted to the detectors where they are amplified by the electronics. A voltage is then outputted which represents measured temperature. The voltage is sampled by the computer where it is converted to temperature by use of computer algorithms.

5 Claims, 6 Drawing Sheets

INFRARED FIBER-OPTICAL TEMPERATURE SENSOR

ORIGIN OF THE INVENTION

The invention described herein was made in part in the performance of official duties by joint inventors—one inventor an employee of the Department of the Navy and two inventors working under contract N60921-87-D-315. The invention may be manufactured, used, licensed by and for the Government for any governmental purposes without payment of any royalties thereon.

This is an application continuation of application Ser. No. 07/501,996 filed Mar. 29, 1990 now abandoned.

FIELD OF THE INVENTION

The invention pertains to infrared thermometers and more specifically to infrared fiber-optical temperature sensors.

BACKGROUND OF THE INVENTION

Electroexplosive devices appear in a multiplicity of sizes and configurations, and are used to detonate and initiate explosives or explosive components in ordnance. In general, electroexplosive devices, conventionally called squibs, are designed to initiate or fire at low-energy levels. A typical configuration involving an electroexplosive device consists of an electrical conductor (bridgewire), often as small as 76 mm in diameter, connected between two metallic posts. The electroexplosive device in turn is connected to an electrical circuit used to initiate the device. When the energy in the bridgewire causes it to reach a given temperature, the primary charge of the explosive device is detonated. Electroexplosive devices can be inadvertently initiated by induced current caused by electromagnetic energy. Conventional safety standards require that induced electrical currents not exceed fifteen percent of the maximum no-fire current of the bridgewire of an electroexplosive device. Maximum no-fire current is defined as the maximum current level that can be maintained in the bridgewire without causing the device to fire. In prior art devices, induced currents are measured using thermocouples disposed in close proximity to the bridgewire. Certain disadvantages result from the use of thermocouples. Thermocouples may alter thermal and electrical characteristics of the electroexplosive device. Further, electrical leads of the thermocouple may alter radio frequency characteristics of the ordnance system under test. Both of these conditions can cause inaccuracies in the measurement of the induced bridgewire currents.

Another problem identified with the use of thermocouples for measuring induced electromagnetic currents in bridgewires involves alignment problems when assembling the thermocouples to the bridgewire. Significant time and proficiency are required to assemble the bridgewire and thermocouple to attain the sensitivity necessary for detecting the presence of induced electromagnetic currents. Assembly techniques for the present invention, employing infrared optical fibers, diminish this problem.

An alternate method proposed for measuring bridgewire currents uses fluoroptic techniques. Certain problems also are encountered using this method. A problem associated with this technique is slow system response time, characteristically in the range of 70 ms. Also, thermal characteristics may be altered due to the method of sensing temperature.

A further method using a coating of wax on the bridgewire and observing changes in the wax when the bridgewire reaches a given temperature characterized by changes in the wax has also been employed. This method is crude when trying to evaluate precise bridgewire temperature versus induced magnetic currents. The wax also alters the thermal characteristics of the bridgewire.

As a result of the deficiencies in the prior art, there is a need for a new and improved means for measuring temperatures of bridgewires contained in electroexplosive devices. This new means must be capable of making measurements without altering thermal or electrical characteristics of the electroexplosive device.

SUMMARY OF THE INVENTION

The present invention is a fast-response, broadbased, infrared fiber-optical temperature sensor capable of measuring both narrow and broad pulsed, low or high energy, infrared signals in small targets, such as heated bridgewires and elements used in electrical-explosive devices. The device comprises a dual probe assembly for collecting infrared radiation from an object to be studied and from ambient sources, an infrared fiber-optics cable assembly for conveying the collected infrared radiation, a detector-electronics unit for measuring and analyzing the collected infrared radiation, a power supply, a microcomputer, a monitor and a recorder for processing, displaying, and recording data. The sensing device can measure temperatures at low levels of bridgewire current in an electroexplosive device utilizing thermal energy transmitted by an infrared optical fiber. The temperatures in question are caused by induced electromagnetic energy that is mainly in the microwatt range. Signal processing techniques are used to enhance the estimate of temperature caused by the induced energy. This method also minimizes the effects of both coherent background noise and noise due to temperature variations along the length of the infrared fiber.

It is an object of this invention to obtain measurements without perturbing the electrical characteristics of the associated circuits of the electroexplosive device.

Another object of the invention is to be a measurement device which is insensitive to electromagnetic radiation.

Still a further object is to provide a device which is easy to install and align while being physically small and adaptable to a multi-sensor configuration.

Another object of the invention is to provide a device to continuously monitor the status of induced currents in a bridgewire responding to both continuous and pulsed stimuli.

Still a further object is to provide a device capable of detecting direct current, pulse current levels, typically in the 20-milliamp range when induced into a bridgewire of one ohm resistance.

Further, it is an object to provide detection of short pulse widths, in the range of 30 milliseconds or less.

Still another object of the invention is to provide an output display capable of providing permanent analog and digital records.

This invention provides a new and novel temperature sensing device for measuring temperatures by means of infrared fiber optical probes and connectors coupled with supercooled detectors at low energy levels, of a bridgewire of an electroexplosive device while fulfilling all of the objects enumerated above.

BRIEF DESCRIPTION OF THE DRAWINGS

These and other features, objects and advantages of the present invention will be readily understood from the following detailed description when read in view of the appended drawings wherein.

DETAILED DESCRIPTION OF THE INVENTION

Figure 1:
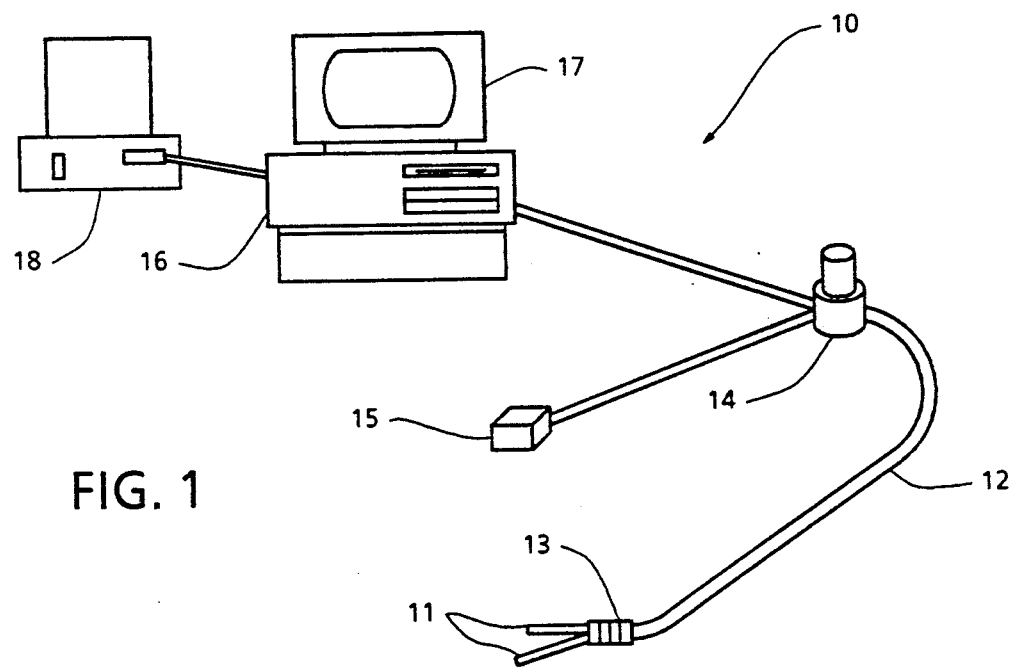
FIG. 1 is a diagram of the system overview.

Referring now to FIG. the infrared fiber-optic temperature sensor system, designated generally by the numeral 10, comprises a probe device 13, a fiber-optical cable assembly 12, a detector-amplifier unit 14, a DC power supply 15, a signal processing device or computer 16, a monitoring device 17, and recording equipment 18. The system utilizes an electroexplosive device 11 with one ohm of resistance in the bridgewire as a heating source, and an infrared fiber cable assembly 12 as a transmission medium between the electroexplosive probe device 13 and the detector-amplifier unit 14 and its associated electronic circuitry. An electric current induced by electromagnetic radiation into the firing leads of an electroexplosive device 11 causes the bridgewire 23 contained in the electroexplosive device 20 to heat. A portion of the radiated heat energy from the bridgewire is collected by an infrared fiber cable assembly 12 which transmits the energy to a liquid nitrogen supercooled indium-antimonide detector unit 14. While an indium-antimonide detector unit was utilized in this embodiment it should be understood that other detectors with appropriate sensitizing may be utilized without departing from the scope of the Applicants' invention.

The infrared fiber and electronics are configured in such a manner that any coherent noise and disturbances will be canceled. This cancellation is accomplished using dual channel sensing devices. At the probe end of the fiber, one of the dual fiber channels measures a reference or ambient temperature while the other measures the heat source. The difference between the heat detected by the probes is amplified and sent to the output of the detector-electronics unit. A sampler circuit samples a voltage signal of the output of the detector-amplifier unit and uses signal processing techniques to enhance signal estimation. The estimated signal is calibrated to produce a direct correlation between the bridgewire-induced current level and the intensity of bridgewire heating deteeted.

Figure 2:
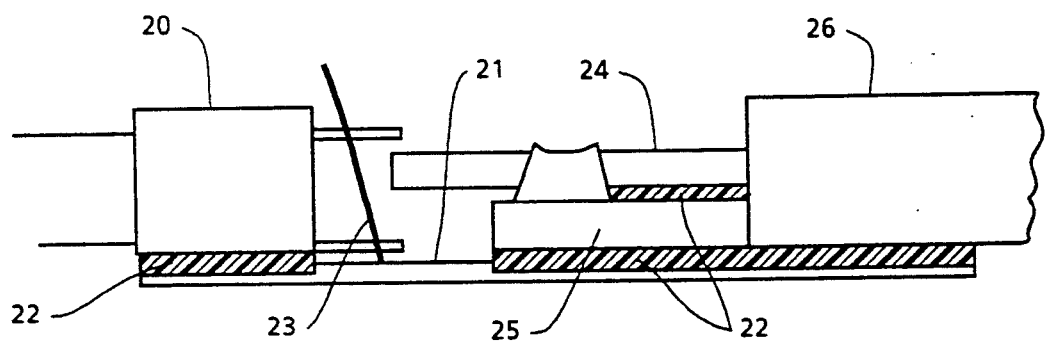
FIG. 2 is a side view of a probe.
Figure 3:
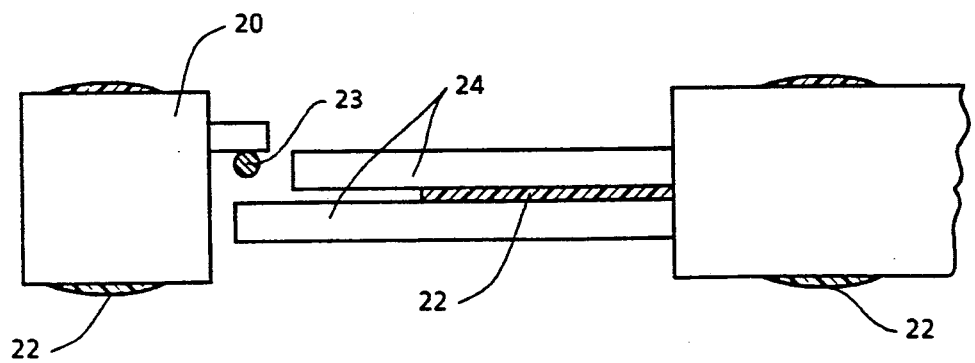
FIG. 3 is a top view of a probe.

FIG. 2 and FIG. 3 are side and top views of one embodiment of a probe assembly. A squib 20 is attached using adhesive compound 22 to the first end of a plastic base 21 so that the bridgewire 23 is disposed toward the center of the base. On the second end of the base 21, a plastic spacer 25 is attached with adhesive compound 22. A cabled infrared fiber 26 is attached to the spacer 25 with adhesive compound 22 with two fibers 24 of the infrared cable 26 extending from the cable toward the bridgewire 23 of the squib 20 and attached to the spacer 25 with adhesive compound 22. One of the fibers 24 collects energy from bridgewire 23 while the other collects the ambient energy near the bridgewire 23 of the squib. It is intuitive that the materials comprising the above-described probe assembly are dielectric and therefore will not alter the electrical characteristics of the small targets under test such as squibs or electroexplosive bridgewires.

Figure 4:
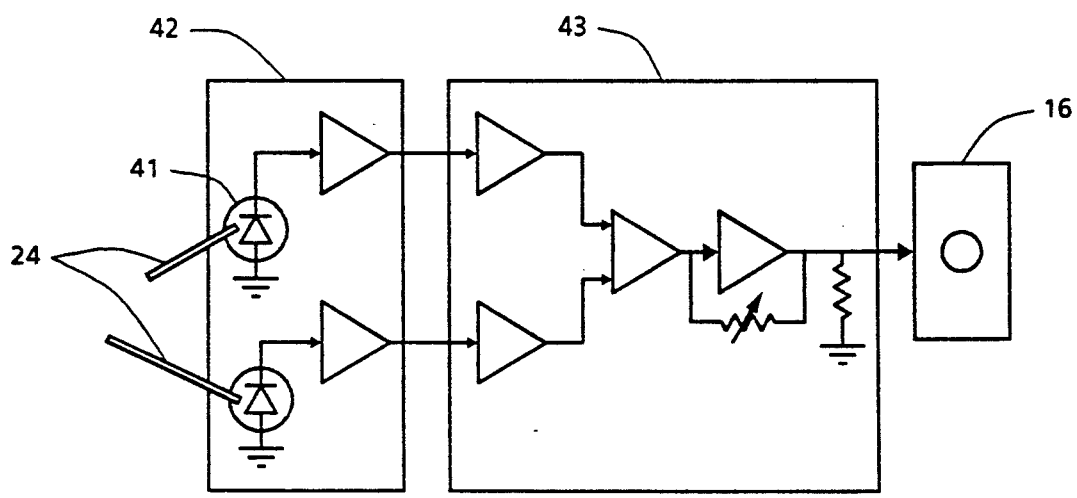
FIG. 4 is a schematic of the detector electronics unit.

FIG. 4 is a schematic of the detector electronics unit. Infrared fibers 24 transmit the infrared energy from bridgewires of the squib to supercooled detectors 41 where the energy is converted to electrical signals. The signals are amplified in the pre-amplifiers 42 before being transmitted to the electronics unit 43. The two signals from the probes are amplified, differenced, and amplified again before being transmitted to the signal processing device 16.

Figure 5:
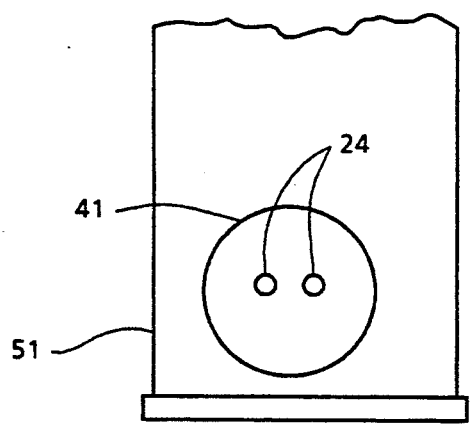
FIG. 5 is a side view of the detector assembly.
Figure 6:
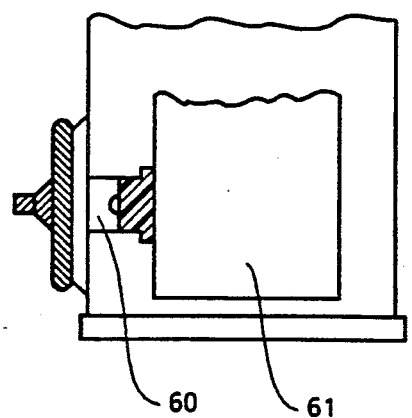
FIG. 6 is a cross-section view of the detector assembly.

FIG. 5 and FIG. 6 show the lens assembly which optimally focuses the infrared energy from the infrared fibers 24 to the detectors 41. The lens assembly is mounted in a Dewars flask 51 with the detectors disposed in a nitrogen well 61 for supercooling. The radiated infrared energy is focused on the detector by a lens 60 which is held in place by a lens holder.

The infrared fiber optical temperature sensor's monitor, recording, and computer unit record and enhance signals from the electronics unit of the infrared fiber optical temperature sensor. The recording equipment 18 and monitoring device 17 record and display either or both analog and digital signals. The analog signals originate from the detector-electronics 14 or from computer 16. Signal processing techniques distinguish small signals from the noise or uncertainties in the electronics and detectors of the infrared fiber optical temperature sensor and also from the uncertainties from the background radiation near the bridgewire of the squib.

Since the output of the detector-electronics unit is related to the induced electromagnetic radiation in the bridgewire, the computer system 16 converts the analog signal of the output detector-electronics unit to digital format, filters and relates the signals to induced electromagnetic current in the bridgewire by curve-fitting techniques. The computer system provides a plurality of functions including:

1. multiplexing a plurality of channels and performing necessary computations for each in a predetermined order;

2. displaying samples or results on a strip chart or cathode ray tube (CRT) monitor;

3. capability of electronically storing samples or results from a specified channel, and displaying them on a strip chart;

4. storing samples and results of curve fits on hard disks; and 5. storing samples or results onto floppy disks for further transfer to other computer systems.

Figure 7:
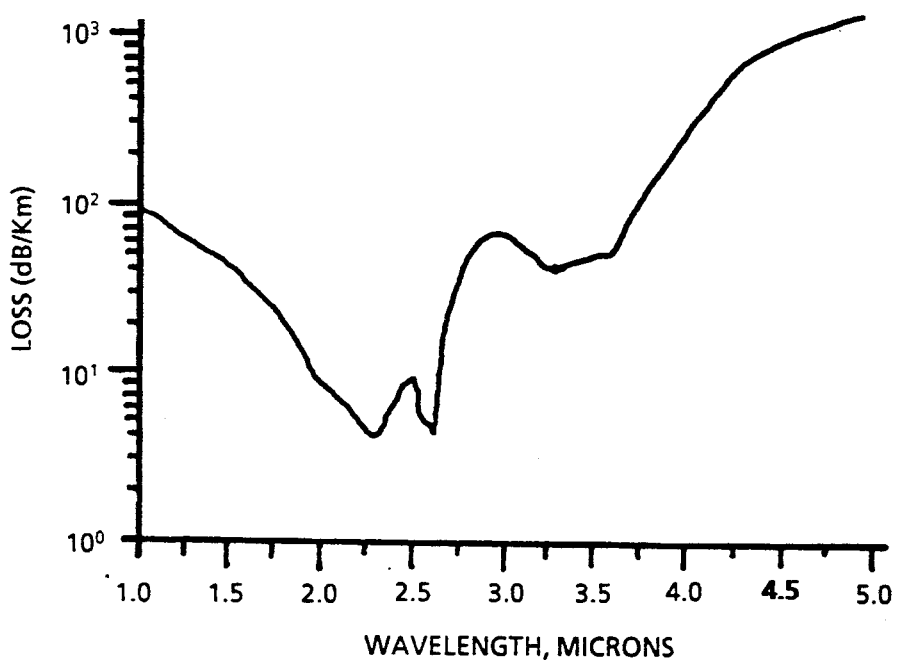
FIG. 7 is a graph depicting infrared fiber transmission characteristics.
Figure 8:
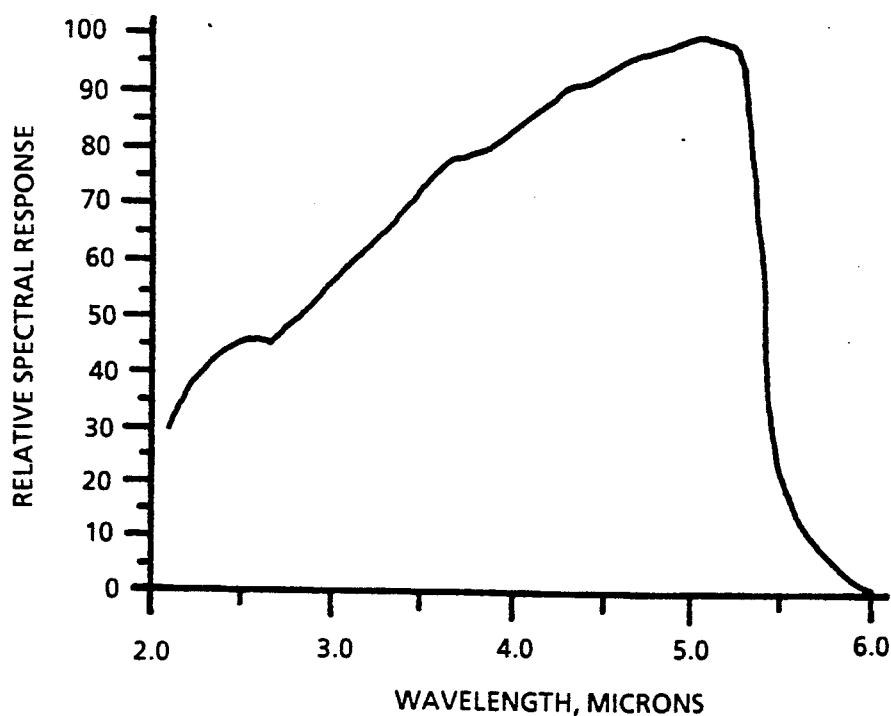
FIG. 8 is a graph depicting spectral response curve of a detector-amplifier.
Figure 9:
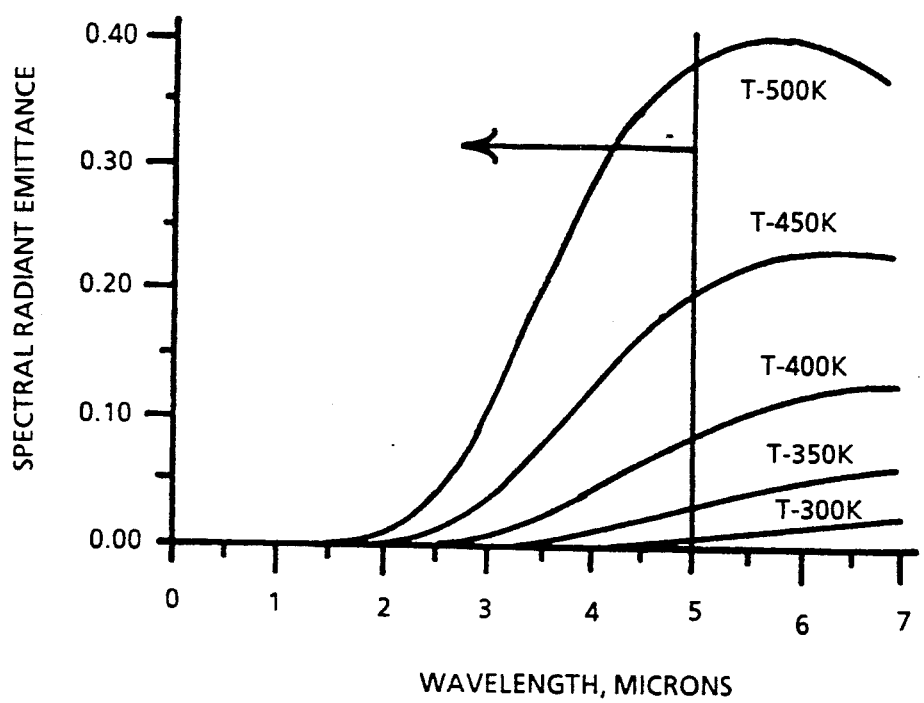
FIG. 9 is a graph depicting the spectral radiant emittance of black body radiation.

Infrared fiber technology is under development and the fibers are not readily available in the commercial marketplace. The present fiber imposes major limitations on system design due to its infrared transmission as illustrated in FIG. 7, and its mechanical properties. Mechanically, the fiber is extremely brittle. FIG. 9 shows the spectral curve of black body radiation versus wave length for five temperatures. Several characteristics of black body radiation are evident from these curves. The total radiant emittance which is proportional to the area under the curve increases with an increase in temperature. The maximum spectral radiant emittance shifts towards the left as the temperature rises. Since some of the temperatures of interest are near ambient, transmission losses and band pass constraints severely limit the small signal sensitivity of an infrared fiber optic temperature measuring system. That is, the small signals transmitted through the fiber are near the noise level of the infrared detector and its associated electronics. To overcome this problem, signal processing techniques are employed to enhance low level energy signals. The normalized spectral response curve of the detector electronics of the infrared optical temperature sensor is shown in FIG. 8. It can be noted that the higher response at the higher wave lengths of the detector amplifier help offset some of the losses seen at higher wavelengths as shown in FIG. 8.

Figure 10:
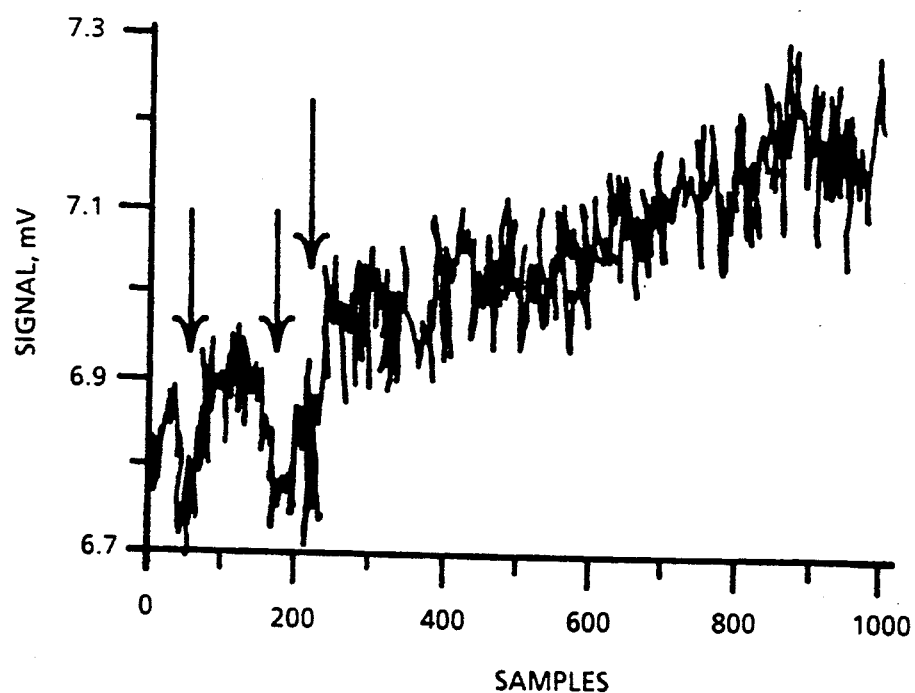
FIG. 10 is a graph depicting experimental result with 20 ma current.
Figure 11:
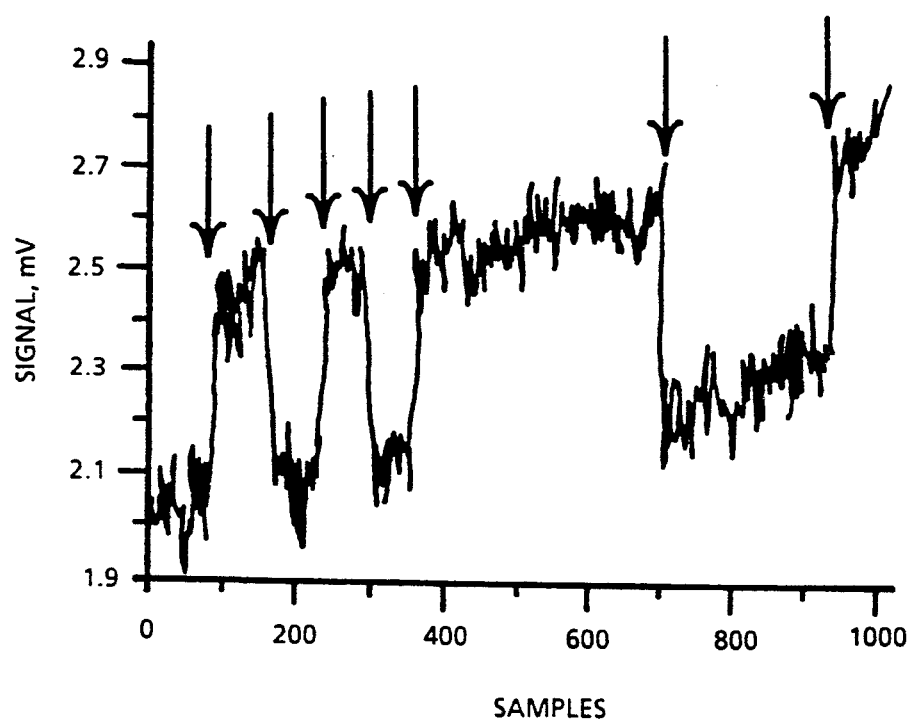
FIG. 11 is a graph depicting experimental result with 40 ma current.
Figure 12:
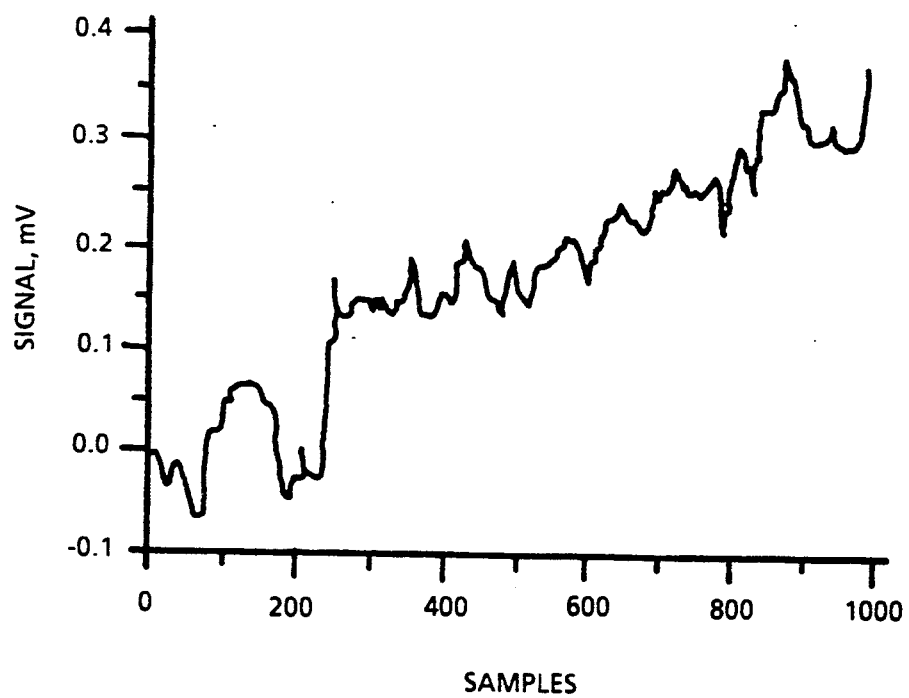
FIG. 12 is a graph depicting signal processed result for 20 ma.
Figure 13:
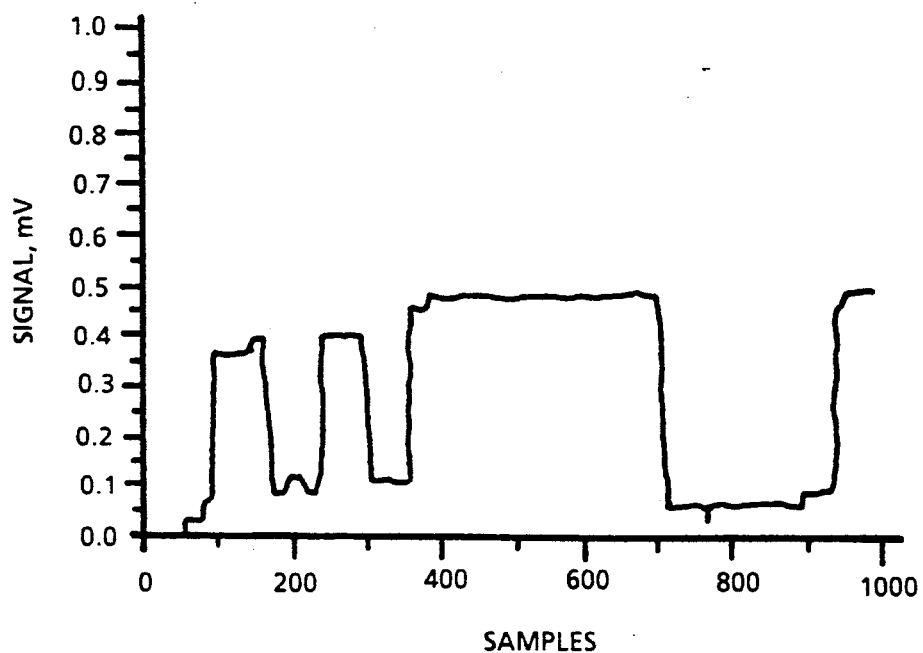
FIG. 13 is a graph depicting signal processed result for 40 ma.
Figure 14:
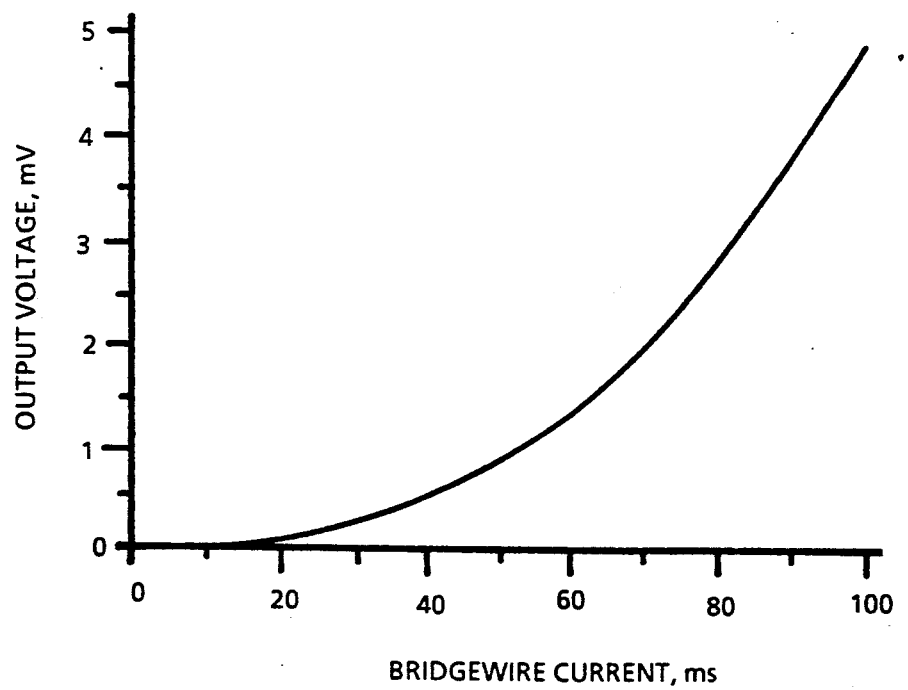
FIG. 14 is a graph depicting input-output relationship.

In measuring the temperature rise in an electroexplosive device rated at 200 milliamp maximum no-fire current, the bridgewire resistance is approximately one ohm with a 76 mm diameter and approximately 0.2 cm length. With 10 percent of maximum no-fire current, that is 20 milliamps, the total amount of energy radiated at the bridgewire is 400 microwatts. Factors which significantly affect the energy collecting capacity of the system are:

a. The collecting area of the fiber is much smaller than the total radiation surface of the bridgewire, thus allowing only a small percent of the total energy to be collected by the fiber.

b. The radiated energy distributes over the entire spectrum as indicated in FIG. 9 and hence only a small portion of it falls within the system's bandwidth.

c. The shift of the spectral radiant emittance curves of FIG. 9 to the right as the temperature decreases shifts available energy out of the system's bandwidth. FIGS. 10 and 11 show the results with bridgewire currents of 20 milliamps and 40 milliamps, respectively. In both figures arrows indicate where the current was applied to or removed from the bridgewire. It can be observed that the high frequency noise is approximately 2.0 millivolts in amplitude and that both curves exhibit a drift. Signal processing techniques are used to enhance the system output and these results are shown in FIGS. 12 and 13 respectively. The overall system input-output relationship is illustrated in FIG. 14 which shows the output responses for different input currents. It can be seen that the processing techniques enhance the determination of the signal level, however, drift still exists and it appears to be random.

Other changes and modifications varied to fit particular operating requirements and environments will be apparent to those skilled in the art. The invention is not to be considered limited to the examples chosen for the purpose of illustration, and includes all changes and modifications which do not constitute a departure from the true spirit and scope of this invention as claimed in the following claims and equivalents thereto.

Having thus described our invention we claim:

1. A device for monitoring temperature by measurement of infrared radiation emitted from a source of heat generated by induced current, wherein radiation energy from the source of heat is on the order of several hundred microwatts, comprising:

probe means for separately collecting the emitted infrared radiation from the source and collecting a reference radiation from ambient temperature near the source, wherein said probe means comprises a first infrared cable having one end thereof disposed to face the source in order to collect the emitted infrared radiation and a second infrared cable having one end thereof disposed to face substantially away from the source in order to collect the reference radiation from ambient temperature near the source;

cable means connected at its proximal end to said probe means for separately transmitting the source radiation and the reference radiation collected therein;

electronic detector means connected at a distal end of said cable means for separately converting the source radiation and the reference radiation transmitted by the cable means into two separate groups of output signals;

means for differencing the two separate groups of output signals to provide a plurality of enhanced output signals;

signal processor means, operatively connected to said means for differencing, for processing the plurality of enhanced output signals;

status indicating means connected to said signal processor means for extracting data from the plurality of enhanced output signals and indicating the induced current in the source; and recorder means connected to said signal processor means for recording the monitored temperature of the source determined from the plurality of enhanced output signals.

2. The device according to claim 1 wherein said probe means comprises a plastic mounting base, radiation-measuring material, and adhesive means, the adhesive means affixing the radiation-measuring material to the base for effecting the measurement of the temperature without electrical perturbance of the source.

3. The device according to claim 1 wherein said source of heat is a detonator bridgewire having a predetermined radiation emitting surface, said probe means has a collecting area on which the emitted infrared radiation impinges substantially smaller than that of the predetermined radiation emitting surface.

4. The device according to claim 1 further comprising a means for supercooling said electronic detector means for improving operation thereof.

5. The device according to claim 1 wherein said probe means includes dual channels within which the emitted infrared radiation from the source and the reference radiation are respectively conducted to the cable means, said cable means having separate optic fibers extending from the dual channels of the probe means respectively transmitting the emitted infrared radiation and the reference radiation to the detector means.

* * * * *